*Reissued Nov. 5th 1872.*

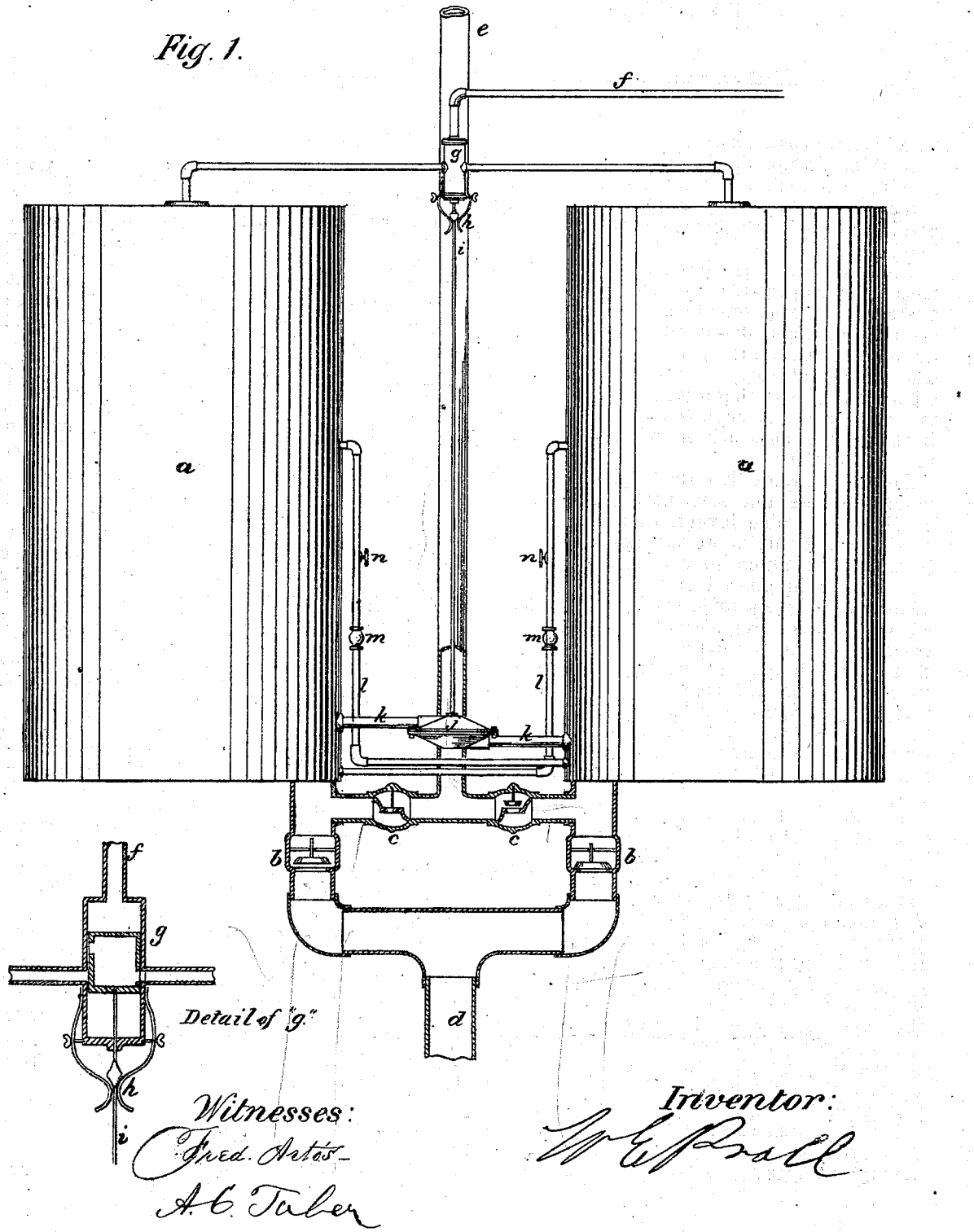

121,962

UNITED STATES PATENT OFFICE.

WILLIAM EDGAR PRALL, OF WASHINGTON, DISTRICT OF COLUMBIA.

IMPROVEMENT IN AUTOMATIC STEAM-TRAPS.

Specification forming part of Letters Patent No. 121,962, dated December 19, 1871.

*To all whom it may concern:*

Be it known that I, WILLIAM EDGAR PRALL, of Washington city, District of Columbia, have invented certain Improvements in Automatic Steam-Pumps, of which the following is a specification:

The nature of this invention consists in the mechanism employed to produce the automatic operation of the cut-off and exhaust valves of the steam-pump herein described, and is intended as an improvement on the patent granted to me on the 4th day of July, 1871, and differing principally from that in that it is double-acting, which is produced by the employment of two cylinders in the place of one, each provided with separate inlet and outlet valves.

I am fully aware that the duplication of the pump-cylinders and other parts would not constitute a patentable invention; but the important feature of this improvement consists in the friction-bar or clutch, so arranged in connection with the diaphragm-rod or its movable attachments as to prevent its too easy movement; the object of this is to regulate the quantity of water discharged from the cylinders. It will be seen that the diaphragm is operated by the greater weight of water on one side alternately as the water is discharged from the opposite side. By the employment of this device the diaphragm could be made to resist a greater or less pressure from the column of water before it would be overcome.

The construction and operation of this invention are as follows, Figure 1 being a partly sectional view.

$a\,a$ are pump-cylinders; $b\,b$, inlet-valves placed in the suction-pipe; $c\,c$, valves in discharge-pipe; $d$, suction-pipe; $e$, discharge-pipe; $f$, steam-pipe; $g$, cut-off valve; $h$, friction-bars and clutch; $i$, rod extending from diaphragm to cut-off valve; $j$, diaphragm and case; $k\,k$, pipes connecting the diaphragm-case with the cylinders on each side of the diaphragm; $l\,l$, small injection-pipes connecting the cylinders, and provided with a sprinkler at one end; $m\,m$, valves in said pipe opening upward toward the sprinkler; $n\,n$, cocks in injection-pipes to regulate the injection water.

The operation of this machine is as follows: The cylinders $a\,a$ are first filled with water through an opening at the top; the rod connecting the diaphragm with the cut-off valve is then forced either up or down, the effect of which will be to let the steam enter one cylinder and cut it off from the other. As the valve is made to act in that manner the steam will force the water down and out through the discharge-pipe. When the water has been driven down to the point where the weight of the column in the opposite cylinder is sufficient to overcome the force of the friction-bar or clutch $h$ the diaphragm will be moved in the opposite direction. This movement will shut off the steam from the discharge-cylinder and let it on the other; the force of the steam will cause the water to open the valve $m$ in the injection-pipe and pass into the cylinder filled with steam and condense the same; water will rush in and refill it, and the operation will be repeated. The diaphragm is so constructed that the force of the steam and vacuum will be resisted by the washer on each side of it after it has moved the proper distance to operate the cut-off valve. This arrangement relieves the diaphragm from any great strain. It will be seen that the pressure is equalized in the cylinders by means of the pipes connecting them. The diaphragm also forms a part of the cylinder, and resists the pressure of the steam the same as is shown in my patent of July 4, 1871, but combines in its action the feature of equilibrium by the connection with the water under pressure on both sides. It is evident that many different arrangements could be adopted to prevent the too easy movement of the diaphragm.

I do not confine myself to any particular method of accomplishing that result.

Having thus described my invention, what I claim, and desire to secure by Letters Patent, is—

1. The friction-bar and clutch $h$ when operating so as to prevent the too easy movement of the diaphragm, in the manner and for the purpose set forth.

2. The arrangement of the pipes $l\,l$ connecting the cylinders $a\,a$, and provided with valves $m$ and stop-cocks $n$ to regulate the flow of water, as shown and described.

W. E. PRALL.

Witnesses:
 EDM. F. BROWN,
 DAVID A. BURR.

(118)